March 11, 1930. F. W. ROBINSON ET AL 1,750,024
ULTRAVIOLET LIGHT GENERATING SYSTEM
Filed Aug. 24, 1927
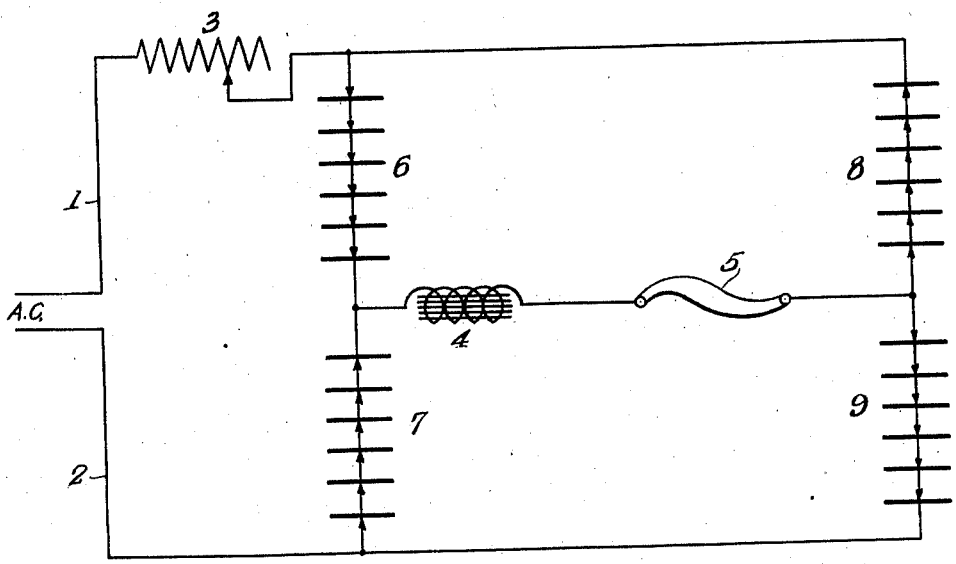
F. W. Robinson
L. F. Bird
INVENTORS
BY Fredk C. Fischer
ATTORNEY Patented Mar. 11, 1930

1,750,024

UNITED STATES PATENT OFFICE

FREDERIC W. ROBINSON AND LESTER F. BIRD, OF NEWARK, NEW JERSEY, ASSIGNORS TO HANOVIA CHEMICAL AND MANUFACTURING COMPANY, OF NEWARK, NEW JERSEY, A CORPORATION OF NEW JERSEY

ULTRAVIOLET-LIGHT-GENERATING SYSTEM

Application filed August 24, 1927. Serial No. 215,062.

This invention relates to ultraviolet light generating systems which convert alternating current into ultraviolet light energy.

This object is accomplished by the novel formation of circuit and electrical elements hereafter described and illustrated in the accompanying drawing which is a diagrammatic wiring plan of the device.

There are several advantages in the arrangement of the elements of this system which result in improved performance over previous systems. Direct current metallic vapor arcs are appreciably simpler and cheaper than the present types of alternating current arcs. This situation is made use of at the present time by the employment of valve tubes, mechanical rectifiers, or by glass mercury rectifiers. The combinations of these rectifiers with metallic vapor arcs are subject to a number of objections, the chief of which is high initial and maintenance costs.

It has been found that a much better combination, free from many of the objectionable characteristics mentioned, can be produced by the use of a dry contact rectifier in conjunction with the metallic vapor arc. The initial cost to manufacture this type of rectifier shows important savings in manufacturing cost; it has a high operating efficiency and for use, especially in portable lamps, the simplicity and light weight of the necessary operating equipment is an important factor in its favor.

A complete list of the units required in this combination to convert alternating current into ultraviolet light radiation is as follows: an electronic dry contact rectifier, a resistor, a small reactor, and the metallic vapor arc tube. All other ultraviolet light generating systems converting alternating current into ultraviolet light are handicapped by the combination which must be used to employ other types of rectifiers. The use of previous types of rectifiers required either comparatively heavy transformers, delicate glass parts, acids, or critical mechanical adjustments. Any of these characteristics rendered the equipment less desirable, and it is the purpose of our invention to provide equipment free from these objections.

The outstanding advantages of the combination of the direct current metallic vapor arc in a system with the electronic dry contant rectifier may be summarized as follows:

The efficiency of this rectifier for such service is as high as 55 to 75 per cent; a saving in weight over the ordinary commercial unit may be effected, amounting to approximately 20 per cent; the rectifier has no moving parts, no liquids, and no delicate mechanical features; the cost of maintenance of this rectifier is very low; the rectifier unit requires in comparison with other rectifiers, a very small space for a given capacity; the load taken from the alternating current mains is at high power factor; the rectifier will not cause radio or other interference while in use.

There are several types of the above mentioned electronic dry contact rectifiers which are suitable for use in this combination. A typical example of such rectifier now in commercial use employs copper oxide in contact with metallic copper. This form of rectifier is rugged in construction and steadfast in service.

Mercury vapor arc lamps of the type under consideration herein, operate in such a manner that from their very nature they constitute a difficult problem for control. For instance, an arc that normally operates on 75 volts and 4 amperes from a direct current supply of 115 volts, requires several times this current for the starting condition. Mercury arc burners are so mounted that they may be tilted to cause the mercury to move from one portion to another within the quartz envelope. When the mercury comes in contact with both electrodes of the lamp, the electrodes are short circuited resulting in a large current flow from the supply lamp. Under some conditions this may result in a blown fuse and an interruption of the supply voltage, which, of course, is not desired.

Heretofore, in order to avoid excessive currents from the supply lines it has been necessary to insert sufficient resistance in series with the lamp to limit the current to a safe value. The resistance necessary to accomplish this is of such a high value that the burner cannot be brought up to normal operation position until the resistance is greatly decreased. The reason for the reduction in the series resistance lies in the very nature of the mercury vapor arc lamp itself, since the resistance of the mercury arc is very low when it is cold and increases markedly when the burner becomes warm. Because of this condition the series resistance necessary to be used with the arc lamp is very much less after the lamp has become warm than when it is cold. In many cases some form of manual adjustment is required to change the resistance after the lamp has been in operation for several minutes.

Inasmuch as mercury arc lamps for the production of ultraviolet rays for therapeutic use is generally used by physicians and non-technical persons in private homes, who are unfamiliar with the manipulation of the adjustable resistance, and who usually prefer not to be bothered with adjusting the series resistance, it is highly desirable that some sort of device be devised for automatically compensating for the change in the resistance of the mercury arc vapor lamp.

By combining a mercury arc vapor lamp with a dry contact rectifying system as herein described, the change in resistance of the lamp is automatically compensated for due to the fact that the resistance of the dry contact rectifier plates is high when the plates are cold and decreased as the plates become warm.

A circuit of this alternating current ultraviolet light generating system is clearly indicated in the drawing hereinafter fully described.

Referring to the drawing on alternating current supply wire designated by the numeral 1 is connected in series with the adjustable resistance 3 and the rectifier, consisting of the rectifying units 6, 7, 8, and 9; bridging the rectifier is a quartz mercury vapor arc burner 5 in series with a smoothing reactor 4.

The path of a current through this system is as follows: when line 1 is positive with respect to line 2, the direction of the current will be through line 1, through the adjustable resistor 3, through the rectifier section 6, through the reactor 4, through the burner 5, through the rectifier unit 9, and back to line 2.

When line 2 is positive with respect to line 1, the direction of the current is from line 2 through the rectifier unit 7, through the reactor 4, through the burner 5, through the rectifier unit 8, back to line 1, through the adjustable resistor 3.

The rectifying action prevents the current from flowing through the system in any order different from that described. The purpose of the reactor in series with the burner is to store sufficient energy so that the voltage delivered to the burner will be practically steady.

This combination of a direct current metallic arc and these rectifier units can be made at an appreciable saving in both cost and weight over the requirements of the present alternating current metallic arc and for this reason is more economical and satisfactory for the desired purpose than any other combination now available.

Although we have described our invention in considerable detail as illustrating the best known embodiment, it will be understood that minor changes may be made without departing from the invention as defined in the appended claims.

We claim:—

1. In combination with a direct current mercury vapor lamp, an apparatus for operating the mercury vapor lamp from an alternating current source, comprising a smoothing reactor in series with the lamp to be operated, and a plurality of electronic dry contact rectifiers interposed between said lamp and the source of alternating current for rectifying the current passing through the lamp, the resistance of said rectifiers decreasing with a rise in temperature to automatically compensate for the increase in the resistance of the lamp when its temperature rises, whereby the resistance of the circuit will be substantially constant.

2. An apparatus for producing ultraviolet rays from an alternating current comprising in combination two groups of static dry contact rectifiers having a negative coefficient of resistance, and a quartz mercury vapor lamp in series between said two groups of rectifiers and common to both said groups, the resistance of said rectifiers decreasing as the resistance of the lamp increases with a rise of temperature, so that the resistance of the circuit will be substantially constant.

This specification signed this 20th day of August, 1927.

FREDERIC W. ROBINSON.
LESTER F. BIRD.